US010683084B2

(12) United States Patent
Gueuning et al.

(10) Patent No.: US 10,683,084 B2
(45) Date of Patent: Jun. 16, 2020

(54) SYSTEM FOR DUAL MANAGEMENT OF ANTI-ICING AND BOUNDARY LAYER SUCTION ON AN AEROFOIL OF AN AIRCRAFT, INCLUDING A FUNCTION OF COLLECTING THE ANTI-ICING AIR

(71) Applicant: SONACA S.A., Gosselies (BE)

(72) Inventors: Dimitri Gueuning, Rixensart (BE); Stephane Debaisieux, Sart-Dames-Avelines (BE)

(73) Assignee: SONACA S.A., Gosselies (BE)

( * ) Notice: Subject to any disclaimer, the term of this patent is extended or adjusted under 35 U.S.C. 154(b) by 327 days.

(21) Appl. No.: 15/741,854

(22) PCT Filed: Jul. 5, 2016

(86) PCT No.: PCT/EP2016/065829
§ 371 (c)(1),
(2) Date: Jan. 4, 2018

(87) PCT Pub. No.: WO2017/005737
PCT Pub. Date: Jan. 12, 2017

(65) Prior Publication Data
US 2018/0194457 A1 Jul. 12, 2018

(30) Foreign Application Priority Data
Jul. 7, 2015 (BE) .................................. 2015/5427

(51) Int. Cl.
*B64C 21/06* (2006.01)
*B64D 15/04* (2006.01)
*B64C 21/08* (2006.01)

(52) U.S. Cl.
CPC .............. *B64C 21/06* (2013.01); *B64C 21/08* (2013.01); *B64D 15/04* (2013.01); *Y02T 50/166* (2013.01)

(58) Field of Classification Search
CPC ....... B64C 21/06; B64C 21/02; B64C 21/025; B64C 2230/06; B64C 2230/00; B64C 2230/22; B64D 15/02; B64D 15/04
See application file for complete search history.

(56) References Cited

U.S. PATENT DOCUMENTS 3,093,350 A * 6/1963 Wilkins ................... B64C 3/50
244/203
5,114,100 A * 5/1992 Rudolph ................ B64C 21/06
244/130

(Continued)

OTHER PUBLICATIONS

International Search Report dated Sep. 14, 2016 in PCT/EP016/065829 filed Jul. 5, 2016.

(Continued)

*Primary Examiner* — Philip J Bonzell
*Assistant Examiner* — Tye William Abell
(74) *Attorney, Agent, or Firm* — Oblon, McClelland, Maier & Neustadt, L.L.P.

(57) ABSTRACT

A system for dual management of anti-icing and boundary layer suction for an aerofoil of an aircraft, including: at least one anti-icing channel and at least one suction channel; a device monitoring boundary layer suction and a device monitoring anti-icing; a first duct collecting the suction air communicating with the suction channel and a second duct supplying anti-icing air connected to the device and communicating with the anti-icing channel; a three-way valve to which the first duct, a suction duct, and a duct for discharging the anti-icing air are connected; and a duct collecting anti-icing air connected to the anti-icing channel, and to the first duct.

16 Claims, 13 Drawing Sheets

(56) References Cited

U.S. PATENT DOCUMENTS

| | | | | |
|---|---|---|---|---|
| 5,899,416 A * | 5/1999 | Meister | ............... | B64C 21/06 |
| | | | | 244/207 |
| 7,673,832 B2 * | 3/2010 | Meister | ............ | B64C 21/025 |
| | | | | 244/123.1 |
| 2016/0332724 A1 * | 11/2016 | Mehring | ........... | F28F 13/003 |

OTHER PUBLICATIONS

Belgium Search Report dated Feb. 22, 2016 in BE 201505427 filed Jul. 7, 2015.

* cited by examiner

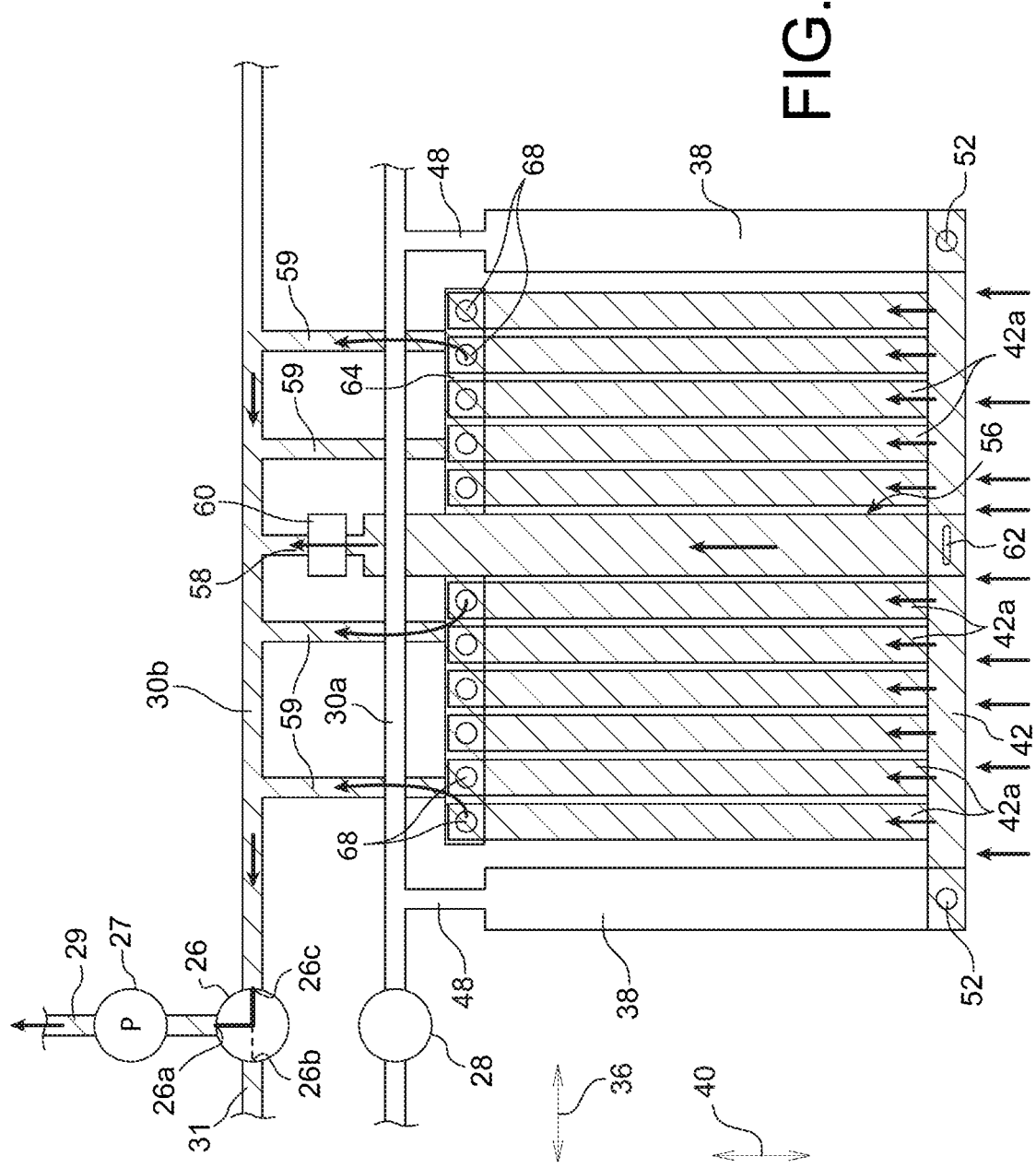

SYSTEM FOR DUAL MANAGEMENT OF ANTI-ICING AND BOUNDARY LAYER SUCTION ON AN AEROFOIL OF AN AIRCRAFT, INCLUDING A FUNCTION OF COLLECTING THE ANTI-ICING AIR

TECHNICAL FIELD

The present invention relates to the field of the anti-icing function management of an aerofoil of an aircraft, and the boundary layer suction management of the same aerofoil.

The aerofoils in question are preferably wings or the tail unit of the aircraft.

The invention is applicable to any types of aircrafts, in particular commercial airplanes.

STATE OF PRIOR ART

From prior art, it is known airplane wing anti-icing systems, comprising channels through which hot air taken on engines circulates, to avoid ice formation on the wings. The main flight phases during which such a system is actuated are take-off, landing, or even landing wait.

From prior art, it is also known boundary layer suction systems on the wings. This suction is made using channels partly delimited by the outer skin of the wing, which is multi-punched to allow suction. This has the purpose to decrease wing drag. It is essentially implemented during the cruise phase.

On the wing, the anti-icing channels and boundary layer suction channels can be alternately arranged. However, in some zones of the aerofoil as for example the leading edge nose, it can be of interest to alternatively provide the anti-icing function, and are boundary layer suction function. This need can result in implementing one or more dual function channels, in which anti-icing air and boundary layer suction air can alternately circulate. This kind of device is for example known from document U.S. Pat. No. 7,673,832.

However, the solution described in this document could be improved, in particular in terms of anti-icing performance and easier design.

SUMMARY OF THE INVENTION

The purpose of the invention is to overcome at least partially the drawbacks relating to devices of prior art.

For this, one object of the invention is first an anti-icing and boundary layer suction system, intended to equip an aerofoil of an aircraft, the system comprising:
  at least one anti-icing channel;
  at least one suction channel partly delimited by a multi-punched wall enabling the boundary layer to be sucked on said aerofoil;
  a boundary layer suction control device;
  an anti-icing control device;
  a duct for collecting the suction air communicating with said suction channel;
  an anti-icing air supplying duct connected to said anti-icing control device and communicating with said anti-icing channel through an anti-icing air intake pipe.

According to the invention, the boundary layer suction control device includes a three-way valve on which said suction air collecting duct, a suction duct, and an anti-icing air exhaust duct are respectively connected, and the system further includes an anti-icing air collecting pipe connected on the one hand to the anti-icing channel, and on the other hand to said suction air collecting duct.

The invention is remarkable in several regards, first in that it provides a function of recovering the anti-icing air exiting the anti-icing channel(s). Advantageously, this hot air is not released inside the aerofoil, likely to have heat sensitive elements/pieces of equipment. This anti-icing hot air is on the contrary brought into the suction air collecting duct, which is thus functionalised to take part in the anti-icing mode. Hot air can then exhaust through the exhaust duct connected to the three-way valve, this anti-icing air exhaust duct possibly opening into an aircraft zone which is less sensitive to heat, preferably remotely of fuel vapour atmosphere and/or composite material elements.

Further, collecting anti-icing air exiting the anti-icing channel(s) provides better anti-icing performance, since it enables a higher circulation flow rate of this air to be applied within the channels concerned. Also, since the suction air collecting duct and the anti-icing air supplying duct are two distinct elements, the latter can have a small cross-section limiting losses by heat exchange with the exterior of this duct.

Further, the invention has a simplified design, in particular insofar as it does not necessarily require multi-punching of all its anti-icing channels, but also because it only necessitates a small number of control valves, which also participates in improving its reliability.

Finally, it is noted that preferentially, the invention requires no check valve.

The invention has also at least one of the following optional characteristics, taken alone or in combination.

Said suction air collecting duct as well as the anti-icing air supplying duct are arranged substantially in parallel to each other, preferably along a span direction of the aerofoil.

The system includes at least one dual function channel in which air for the anti-icing function and air for the boundary layer suction can alternately circulate, said dual function channel being partly delimited by the multi-punched wall enabling the boundary layer to be sucked on said aerofoil, and said dual function channel:
  communicates with said anti-icing air intake pipe; and
  preferably, communicates with a suction air collecting pipe, the latter being connected to said suction air collecting duct, preferably via a controlled valve.

Preferably, the suction air collecting duct and the anti-icing air supplying duct extend along a span direction of the aerofoil, both for a "longitudinal concept" type system, and for a "chord concept" type system.

In this regard, in the "longitudinal concept" in which the channels extend fully or mostly along the span direction, it is preferentially ensured that the anti-icing air circulating through the dual function channel does not penetrate said anti-icing air collecting pipe.

Further, the system thereby comprises preferentially at least one suction air collecting secondary pipe allowing communication between each boundary layer suction channel, and the suction air collecting duct.

Preferably, the system includes several anti-icing channels and several boundary layer suction channels substantially parallel to each other, with at least some of the anti-icing channels and of the boundary layer suction channels alternately arranged.

The system successively comprises, in a chord direction from a leading edge of the aerofoil:
  a dual function channel;
  a plurality of said anti-icing channels; and then an alternation between said air suction channels and the other anti-icing channels, said anti-icing channels, said suction channels and said dual function channel extending in parallel to each other, along a span direction of the aerofoil.

Still in the "longitudinal concept", it is preferentially contemplated that the anti-icing air intake pipe, each suction air collecting pipe, each suction air collecting secondary pipe and the anti-icing air collecting pipe each follow the aerodynamic profile of the aerofoil, by being arranged in parallel planes, spaced from each other along a span direction of this aerofoil.

In the "chord concept", in which the channels extend mostly in the chord direction, the system preferentially comprises a plurality of dual function channels in which air for the anti-icing function and air for the boundary layer suction can alternately circulate, among which:

a dual function primary channel, directly communicating with said anti-icing air intake pipe; and dual function secondary channels, communicating on the one hand with the dual function primary channel and on the other hand with said anti-icing air collecting pipe, said dual function secondary channels being arranged substantially in parallel to each other and substantially orthogonal to the dual function primary channel and to the anti-icing air collecting pipe.

Preferably, said dual function secondary channels are arranged in parallel planes, spaced from each other along a span direction of the aerofoil.

The suction air collecting duct, the anti-icing air supplying duct, the dual function primary channel and the anti-icing air collecting pipe are arranged substantially parallel to each other along a span direction of the aerofoil.

Preferably, the suction air collecting duct and the anti-icing air collecting pipe communicate together through at least one junction pipe.

One object of the invention is also an aerofoil for an aircraft comprising at least one anti-icing and boundary layer suction system, such as described above. The aerofoil is preferentially a wing or a tail unit, preferably a vertical tail unit, or possibly a horizontal tail unit.

Finally, one object of the invention is also an aircraft comprising at least one such aerofoil or at least one such anti-icing and boundary layer suction system.

Further advantages and characteristics of the invention will appear in the non-limiting detailed description below.

BRIEF DESCRIPTION OF THE DRAWINGS

The invention could be better understood upon reading the detailed description that follows, of exemplary implementations which do not limit of the same, as well as upon examining the appended drawings among which;

FIG. 17 is a similar view to that of FIG. 14, depicting the operation of the system during a boundary layer suction phase.

DETAILED DESCRIPTION OF PARTICULAR EMBODIMENTS

Figure 1:
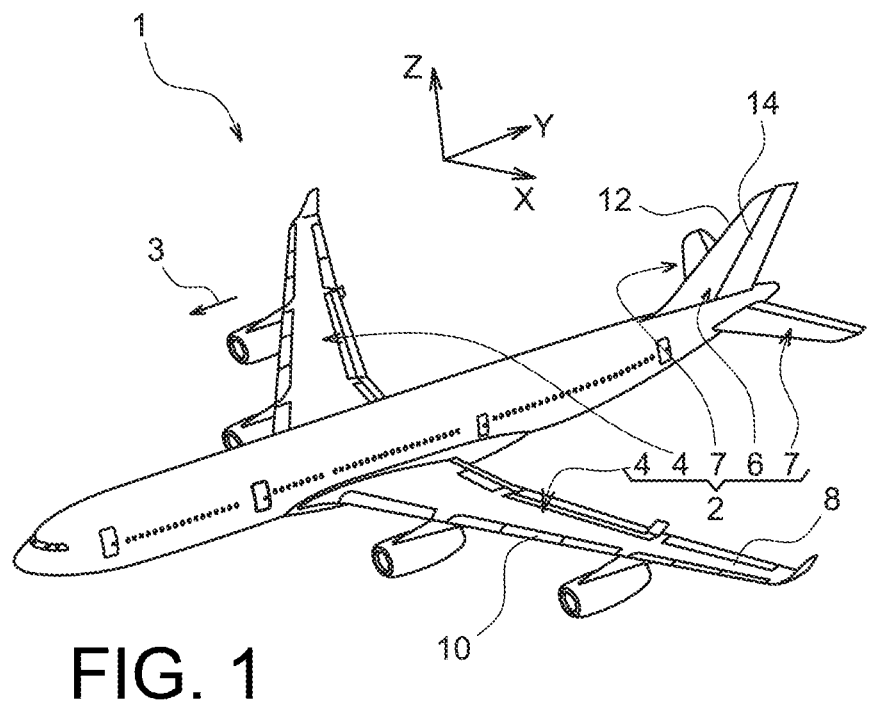
FIG. 1 represents a perspective view of an airplane equipped with two wings according to the invention.

In reference to FIG. 1, an airplane 1 of the commercial type is shown, on which the present invention is applied. Conventionally, the airplane 1 includes a set 2 of aerofoils comprising two wings 4, a vertical tail unit 6 also called a "vertical stabiliser", and two horizontal tail units 7. The invention is particularly applicable to the front part 10 of the wings 4 and of the vertical tail unit 6, but is also applicable to the horizontal tail units 7. In this regard, it is noted that in the description, the terms "front" and "rear" are to be considered along a direction of advance 3 of the airplane, as a result of the thrust exerted by its engines.

The invention relates to an anti-icing and boundary layer suction system 20 on an aerofoil. In the description below, the aerofoil is one of the wings 4, and the system 20 is implanted inside the front part 10 of this wing, comprising the leading edge. However, it is noted that the invention could be applied identically or similarly to the other wing 4, or even to the front part of the vertical tail unit 6. In addition, it is here an implantation in a fixed front part of the wing, even if the implantation in a mobile flap shutter of the leading edge could be contemplated, without departing from the scope of the invention.

Figure 2:
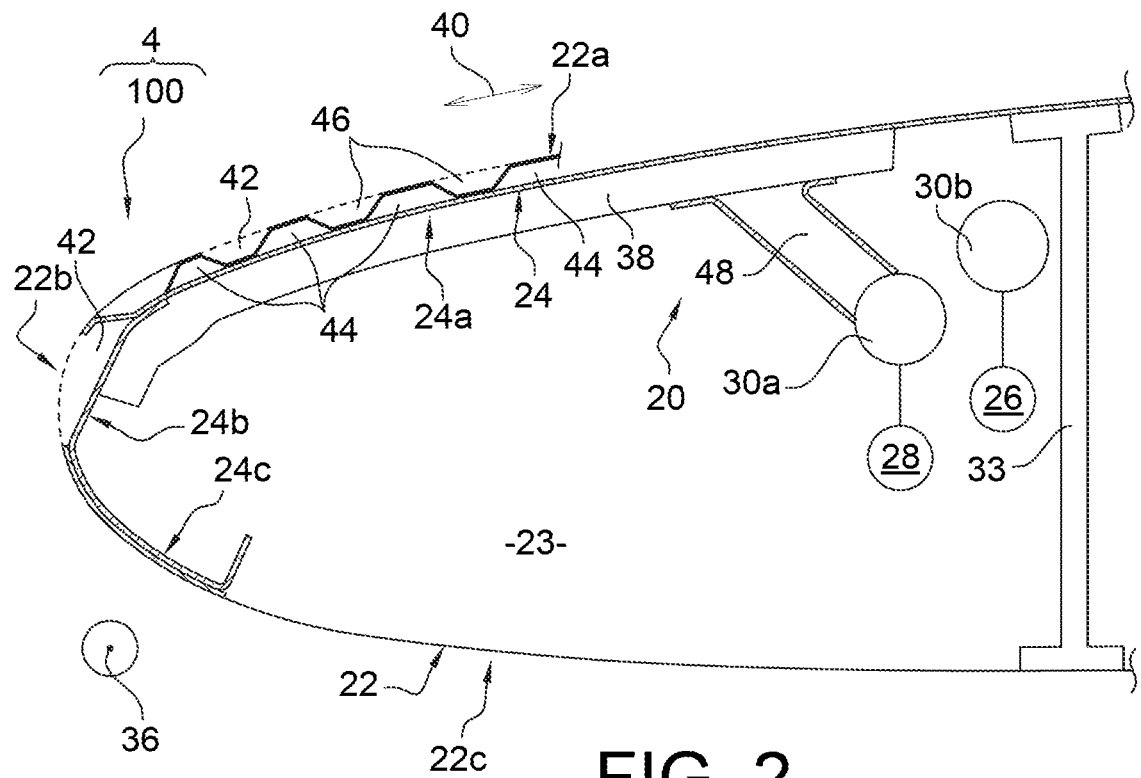
FIG. 2 represents a transverse cross-section schematic view of a front part of one of the wings of the airplane shown on the preceding figure, the wing being equipped with an anti-icing and boundary layer suction system, according to a first preferred embodiment of the invention.

In reference to FIG. 2, the front part 10 of the wing integrating the system 20 is represented. The front part 10 comprises an outer skin 22 successively defining an upper zone 22a, a nose zone 22b and a lower zone 22c. On the other hand, the system 20 includes an inner skin 24 also comprising an upper zone 24a, a nose zone 24b and a lower zone 24c. Both upper zones 22a, 24a are spaced from each other so as to define a plurality of air circulation longitudinal channels, which will be detailed hereinafter and which can be manufactured in the manner set out in document EP 1 327 489. Both nose zones 22b, 24b are also spaced from each other, so as to define a dual function channel therebetween, which will be also described below. On the other hand, both lower zones 22c, 24c are substantially pressed against each other, insofar as in this zone, the inner skin 24 only extends on a small length rearwardly, as is visible in FIG. 2. As indicated hereinafter, slots can be provided between both pressed lower zones 22c, 24c, so as to enable hot air from the dual function channel to be discharged, and thus ensure anti-icing of the lower part of the leading edge.

In reference to FIGS. 2 to 5 together, the dual management anti-icing and boundary layer suction function system 20 first includes a device 26, for controlling the boundary layer suction. It is an electrically controlled valve 26, of the three-way valve 26a, 26b, 26c type. This valve 26 enables in particular an airflow rate intended to sucked by a pump 27 or similar, arranged on a suction duct 29 connected to the first way 26a of the valve 26, to circulate. The second way 26b is connected to an exhaust duct 31 the function of which will be described hereinafter, whereas the third way 26c is connected to an anti-icing air exhaust duct 30b which will be also described subsequently.

By way of indicating purpose, it is noted that conventionally, the pump is arranged outside the wing, as well as the exhaust duct 31 opens into a non-heat sensitive zone, outside the aerofoil, as will be described in reference to FIG. 10a.

The system 20 also comprises an anti-icing control device 28, this device being conventional, preferably of the electrically controlled regulation valve type. This valve 28, also called WAIV ("Wing Anti-Icing Valve"), enables the hot air flow rate taken on the engines and injected between the outer and inner skins to be regulated in order to avoid icing of the zones in question. This hot air taken on the engines is called an "anti-icing air".

The device 28 is connected to an anti-icing air supplying duct 30a, being an integral part of the system 20. Unlike the duct 30b which is used for the boundary layer suction phases on the wing, this duct 30a is used during the anti-icing phases, as will be clearly apparent hereinafter.

Both ducts 30a, 30b are straight ducts, extending in parallel to the span direction 36 of the wing, in the free space 23 of the front part 10 of the wing, defined between the upper zones 22a, 24a and the lower zone 22c. This free space 23 is delimited rearwardly by a front spar 33 of the wing, this spar 33 providing a structural function for the wing in a known manner per se. Both ducts 30a, 30b run in parallel to each other in proximity of this front spar 33 extending along the span direction 36.

At the opposite end to that at which the valves 26, 28 are located, the ducts 30a, 30b are sealed. Before being sealed, they can be used for the operation of one or more other modules as the one which will be described hereinafter.

As discussed above, the system 20 includes a plurality of air circulation channels, defined between the outer 22 and inner 24 skins, and arranged in parallel to the span direction 36, by being substantially straight. From front to rear, there are successively a dual function channel 42, a plurality of adjacent anti-icing channels 44, another dual function channel 42, and then an alternation between air suction channels 46 and other anti-icing channels 44. This alternation can however be broken, for example by providing successively two suction channels 46 as has been schematically represented in FIG. 3, in the proximity of the ducts 30a, 30b.

Each dual function channel 42 is specific because it is foreseen to circulate alternately therein anti-icing air, and air for the boundary layer suction. For the implementation of this second function, as regards the forwardmost channel 42, the nose zone 22b which delimits it takes the form of a multi-punched wall enabling the boundary layer to be sucked, in a known manner to those skilled in the art. The outer skin 22 thus has a multi-punching at this place of the nose zone 22b, much like in the upper zone 22a for making the rear most dual function channel 42.

Such a multi-punching is also provided on the parts of the upper zone 22a delimiting the boundary layer suction channels 46. On the other hand, the other parts of the upper zone of the outer skin 22, delimiting the anti-icing channels 44, are free of such multi-punching since they are not dedicated to the boundary layer suction. It is noted that the distribution of the channels 42, 44, 46 is here given only by way of indicating example, but this distribution can be adapted depending on the specific needs found on each aerofoil, in terms of anti-icing and suction.

The channels 44, 46 have cross-sections with identical or similar sizes and shapes, for example with a trapezoidal cross-section. The dual function channel 42, located at the nose, has itself a higher cross-section, with a further complex shape.

The system 20 besides includes a plurality of pipes enabling the channels 42, 44, 46 to communicate with the ducts 30a, 30b.

These pipes, which will be described hereinafter, each extend along a chord direction 40 by being arranged in parallel planes spaced from each other along the span direction 36. These pipes are not straight, but they each follow the aerodynamic profile of the wing by being housed under the inner skin 24. Each of them takes the form of an upwardly open cap pressed against the inner skin 22, this one thus also taking part in forming these pipes. Alternatively, at least some of these pipes can be directly made by a particular shaping of the inner skin 24.

There is first an anti-icing air intake pipe 38, connected to the duct 30a as close as possible to the valve 28. More precisely, this connection is made through a junction pipe 48 with a small length, located on or in the proximity of a rear end of the pipe 38. The junction pipe 48 establishes a permanent fluid communication between the duct 30a downstream of the valve 28, and the pipe 38.

Figure 6A:
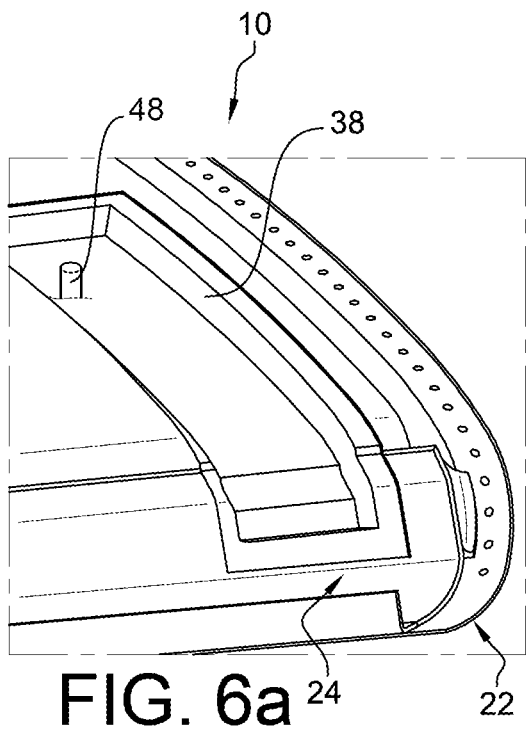
FIGS. 6a to 7b show perspective views representing the means implemented for supplying the anti-icing channels of the system, and collecting the anti-icing air.
Figure 6B:
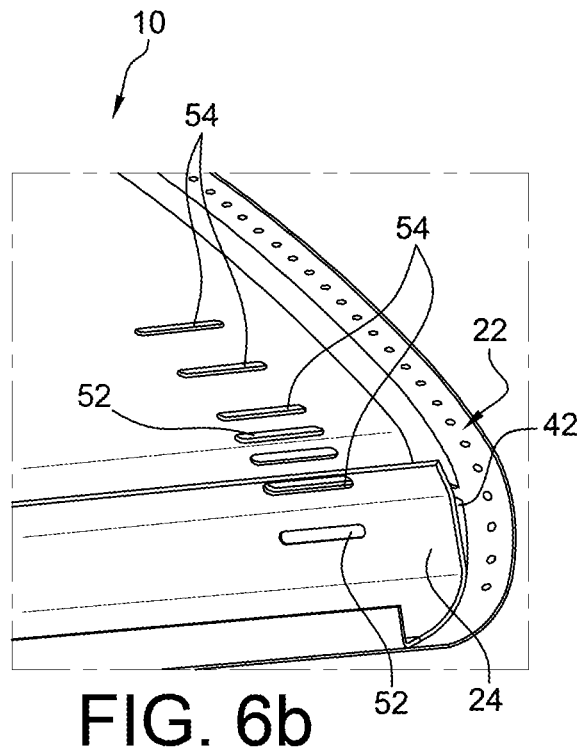

At its front end, the anti-icing air intake pipe 38 communicates with a first end of the dual function channel 42, through an anti-icing air inlet port 52 provided through the inner skin 24. Analogous ports 54 are provided along the chord direction 40, so as to ensure communication between the pipe 38 and the anti-icing channels 44, as well as communication between the pipe 38 and the other dual function channel 42. Such ports 52, 54 can for example be of a circular cross-section as has been shown schematically in FIG. 3, or of an oblong shape as is visible in FIG. 6b. In this regard, it is noted that this FIG. 6b corresponds to FIG. 6a, without the pipe 38 which has been removed to make these ports 52, 54 visible.

Figure 3:
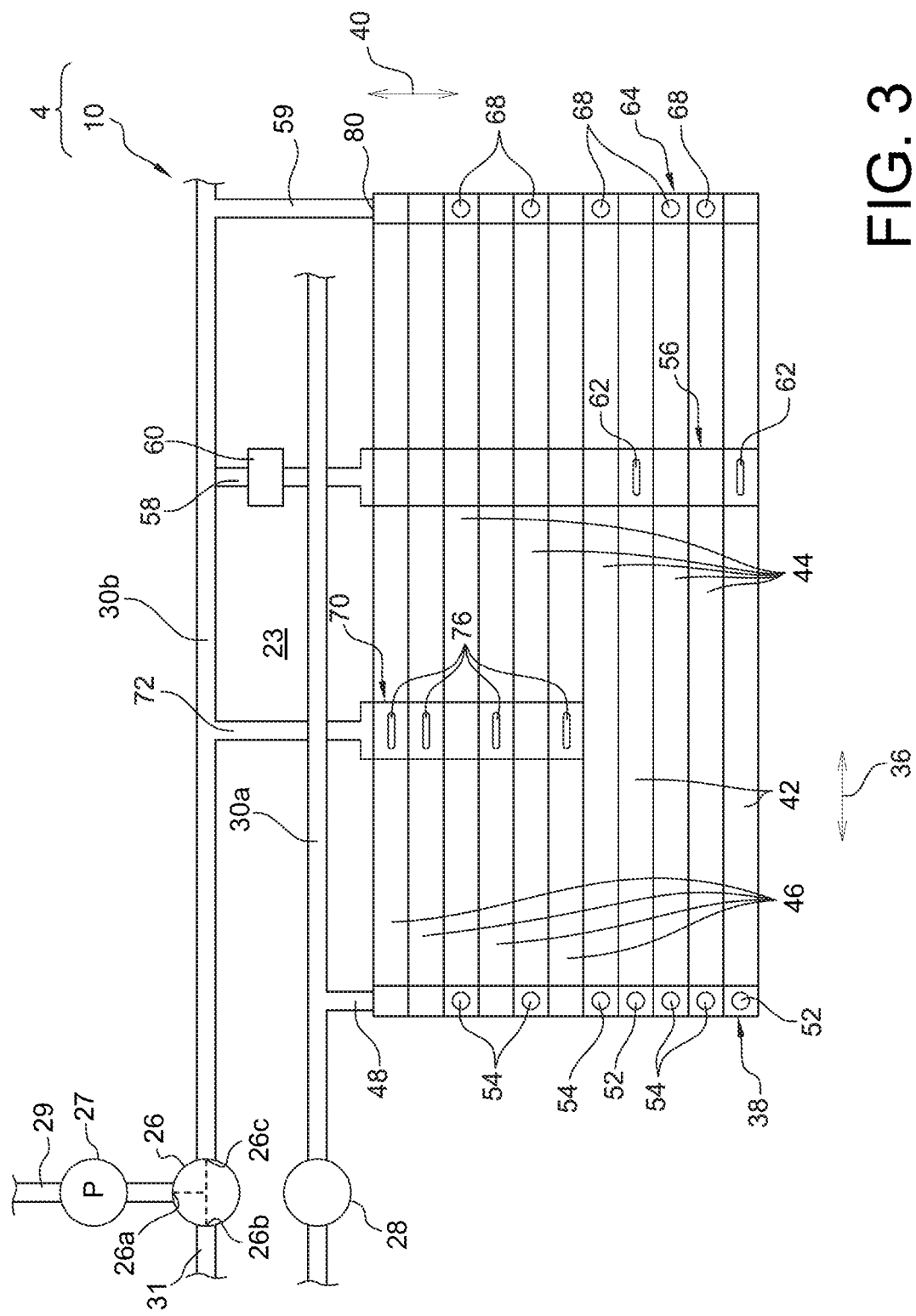
FIG. 3 is a top schematic view of the system shown in FIG. 2.
Figure 4:
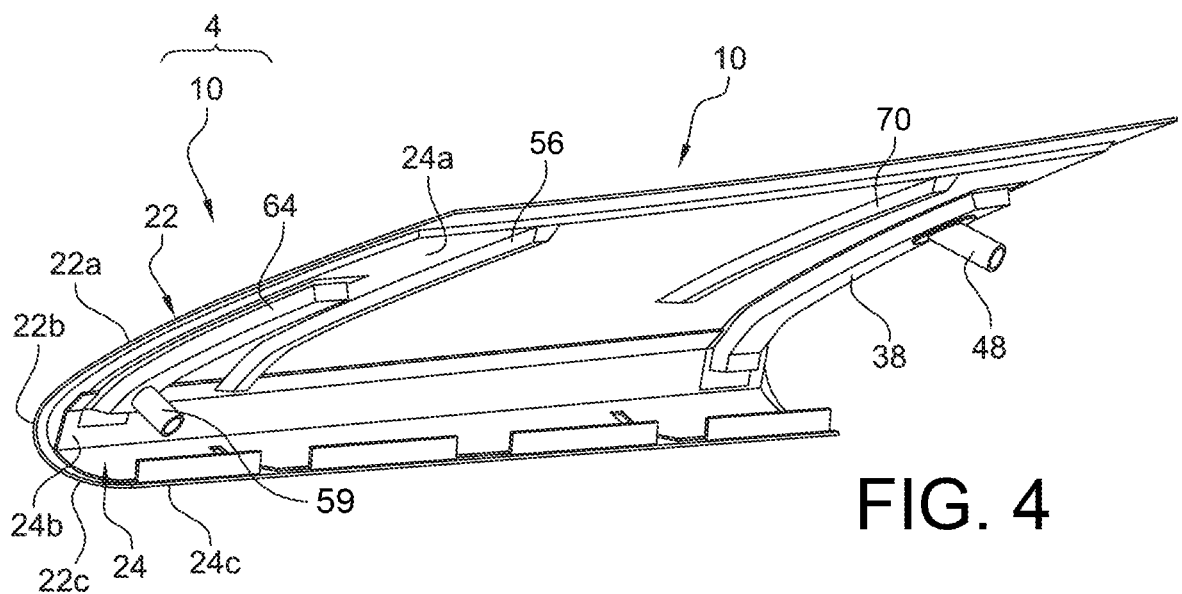
FIG. 4 is a perspective view of that shown in FIG. 2.

The system 20 further includes several suction air collecting pipes 56, a single one of which has been represented in FIG. 3. This pipe 56 is connected to the anti-icing air exhaust duct 30b, using a junction pipe 58 with a small length, located on or in the proximity of a rear end of the pipe 56. The junction pipe 56 is equipped with a controlled valve 60 allowing or prohibiting suction air to pass between the pipe 56 and the duct 30b, depending on its position. At its front end, the suction air collecting pipe 56 communicates with the front dual function channel 42, through a suction port 62 provided through the inner skin 24. The same is true for the connection with the dual function channel 42 located more backwards.

The suction air collecting pipe 56 is connected to the front channel 42 downstream of the connection of the pipe 38, facing an anti-icing air circulation direction through the channel 42 during an anti-icing phase.

Each dual function channel 42 has preferably a sealed end opposite to that integrating the anti-icing air inlet port 52. On the other hand, the system 20 also includes an anti-icing air collecting pipe 64, which communicates with the anti-icing channels 44 at one end thereof opposite to the connection end with the pipe 38. The pipe 64 is thus disposed at the end of the front part 10 of the wing, opposite to the end housing the anti-icing air intake pipe 38.

At its downstream end, the anti-icing air collecting pipe 64 has the feature of being connected to the duct 30*b* through a junction pipe 59 with a small length. The junction pipe 59 establishes a permanent fluid communication between the duct 30*b* upstream of the valve 26, and the pipe 64.

The communication between the pipe 64 and the anti-icing channels 44 is made through anti-icing air collecting ports 68, also provided through the inner skin 24. These ports 68 are thus arranged at the downstream end of the anti-icing channels 44, facing an anti-icing air circulation direction through these channels 44 during an anti-icing phase.

Figure 7A:
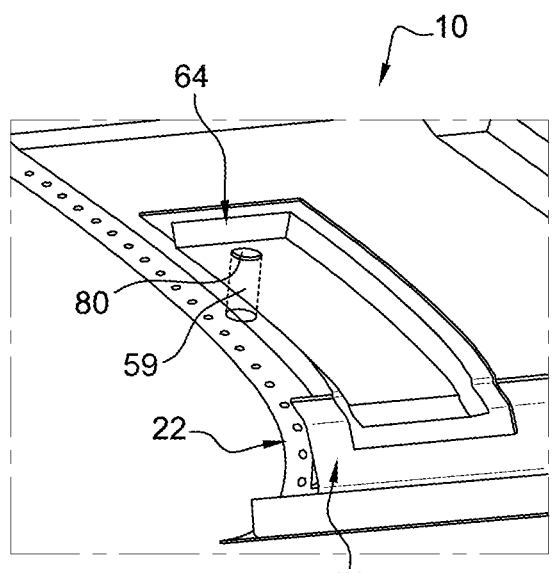
Figure 7B:
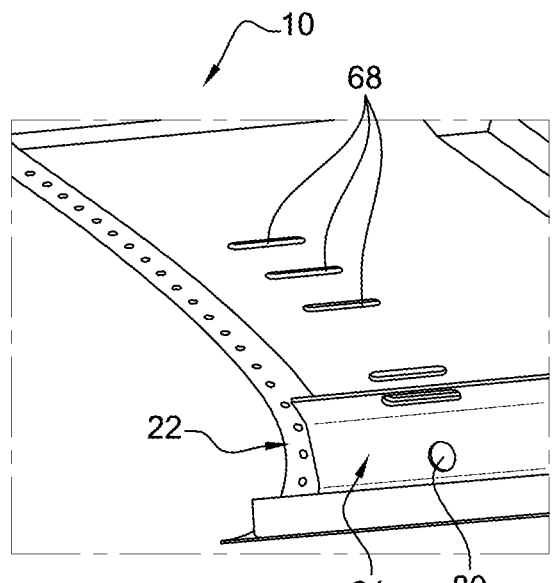

Such ports 68 can for example be of a circular cross-section as has been schematically shown in FIG. 3, or of an oblong shape as is visible in FIG. 7*b*. In this regard, it is noted that this FIG. 7*b* corresponds to FIG. 7*a*, without the pipe 64 which has been removed to make the ports 68 visible. It is noted on the other hand that the pipe 64 has at its downstream end an anti-icing air outlet port 80, on which the junction pipe 59 is connected.

The system 20 also includes one or more suction air collecting secondary pipes 70, a single one of which has been represented in FIG. 3. This pipe 70 is connected to the duct 30*b*, the connection being made using a junction pipe 72 with a small length, located on or in the proximity of a rear end of the pipe 70. The junction pipe 72 establishes a permanent fluid communication between the duct 30*b* downstream of the valve 26, and the pipe 70.

Figure 5:
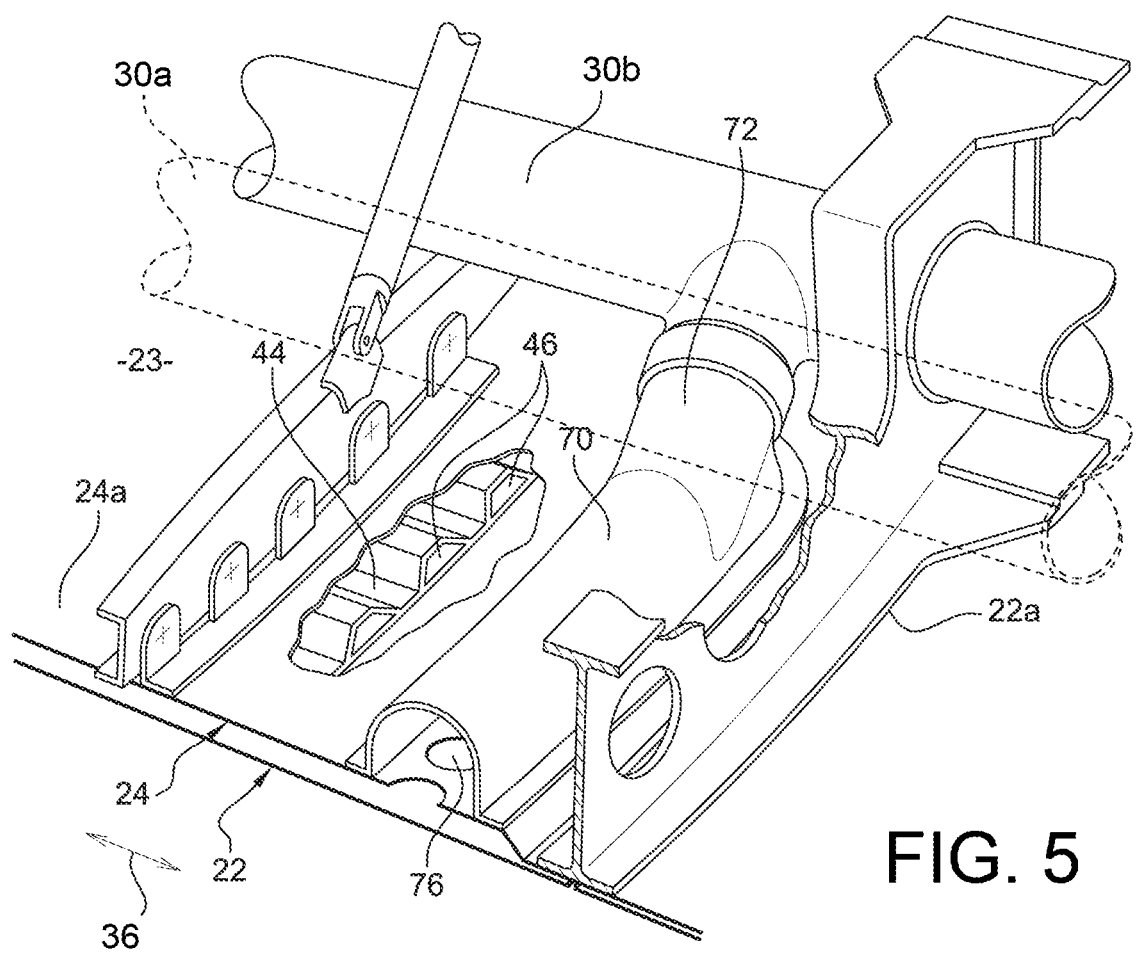
FIG. 5 is a partial enlarged view of that shown in the preceding figure, according to another perspective angle.

Each suction air collecting secondary pipe 70 communicates with each of the suction channels 46, through suction secondary ports 76 provided through the inner skin 24, as is shown in the enlarged view of FIG. 5.

The pipes 38, 70, 56, 64, located in parallel planes spaced from each other along the span direction 36, are arranged in the order set out below, in the fluid flow direction through the nose channel 42. However, a different order could also be assumed, without departing from the scope of the invention.

Figure 8:
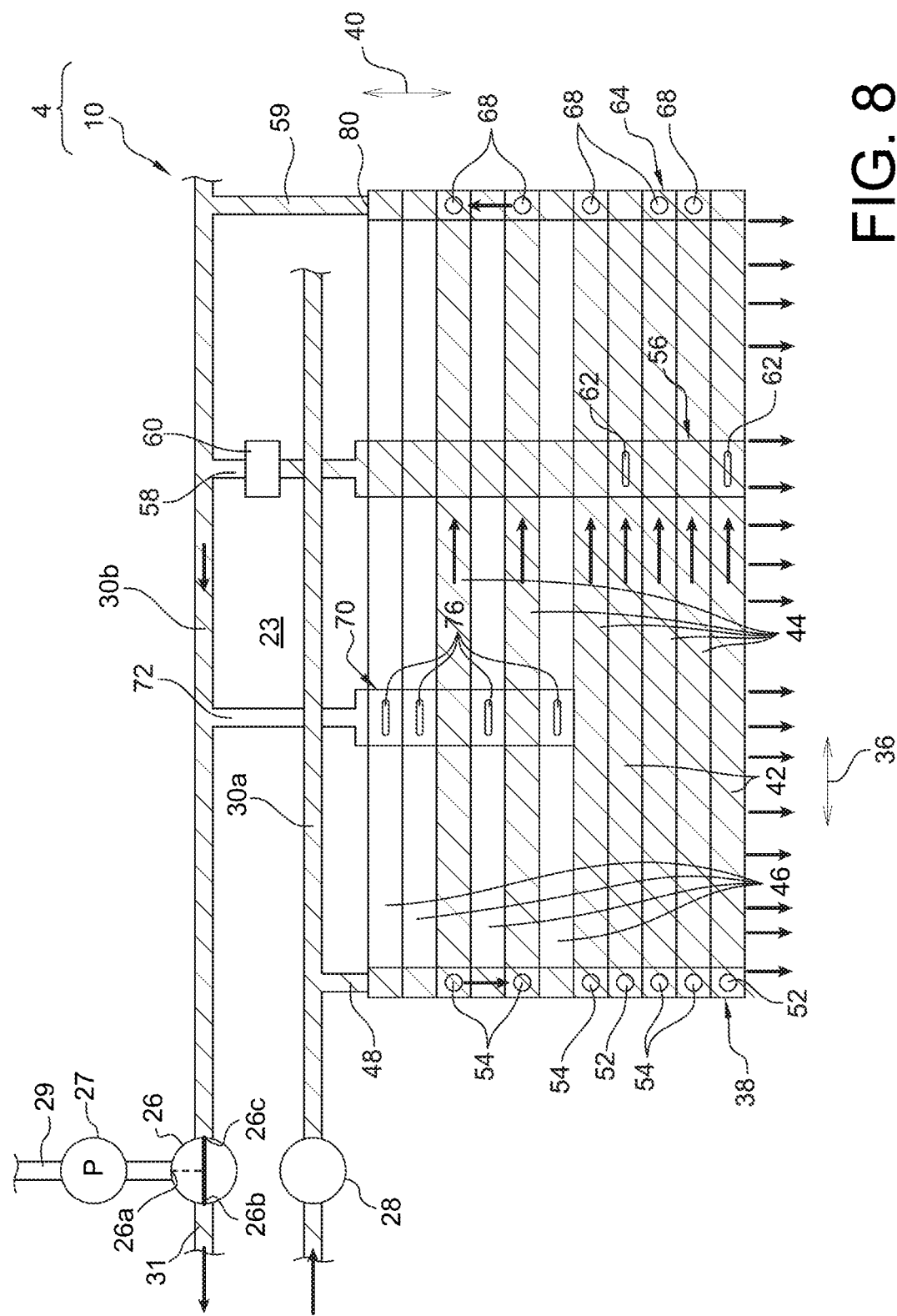
FIG. 8 is a view similar to that of FIG. 3, depicting the operation of the system during a wing anti-icing phase.
Figure 9:
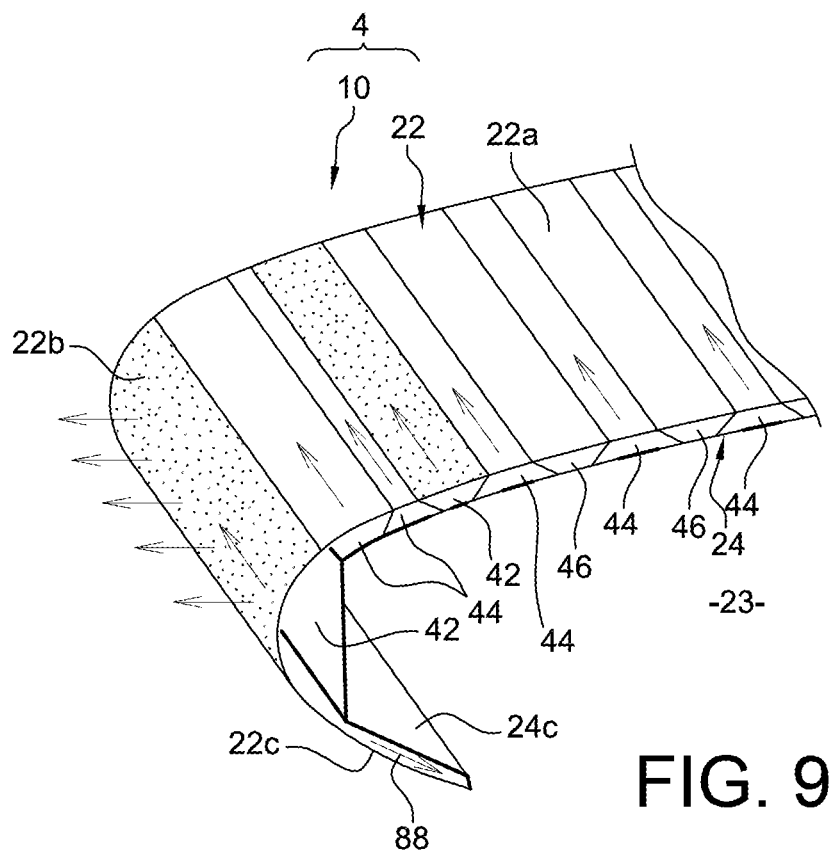
FIG. 9 is a perspective view of the front part of the wing, also depicting the operation of the system during an anti-icing phase.
Figure 10:
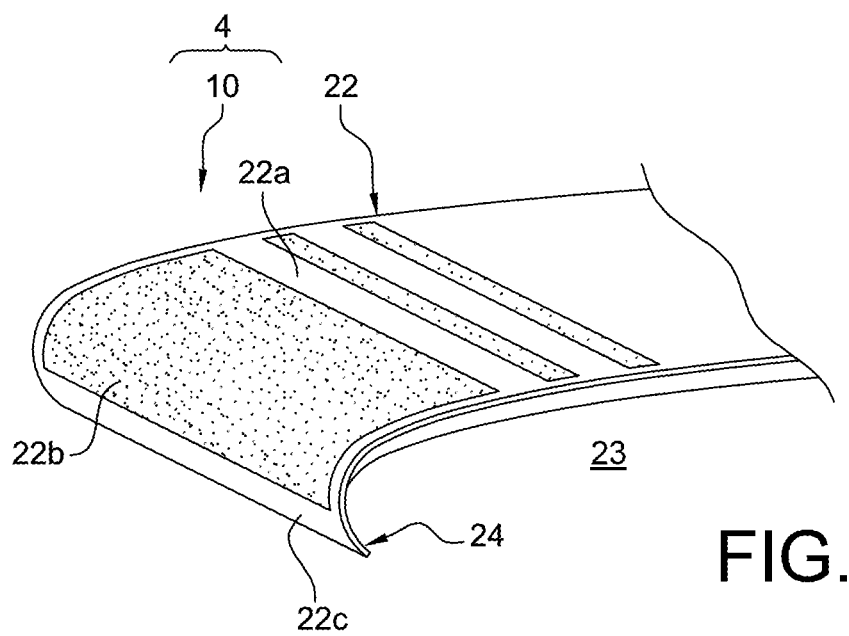
FIG. 10 is a perspective view showing the zones of the wing benefiting from the anti-icing function.
Figure 10A:
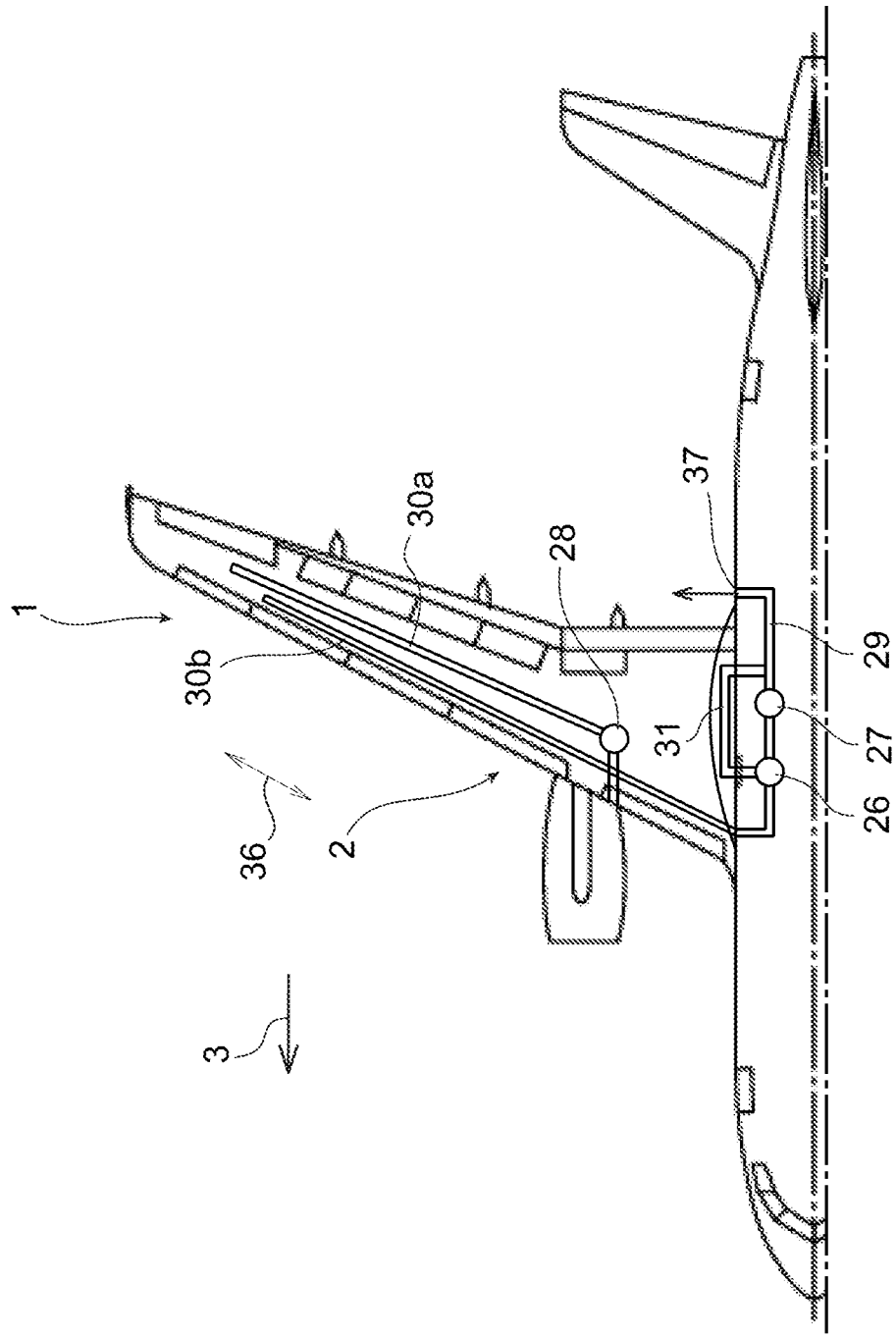
FIG. 10a represents a top half-view of an aircraft, on which an exemplary implantation of the system shown in the preceding figures has been represented.

In reference now to FIGS. 8 to 10, the operation of the system 20 is represented during an anti-icing phase of the front part 10 of the wing 4. In these figures, the arrows symbolise the hot air circulation direction through the different elements of the system. In addition, shaded and hatched zones correspond to the zones travelled by the anti-icing air.

During the anti-icing phase, the valve 26 establishes the fluid communication between both ways 26*b*, 26*c*, so as to communicate the duct 30*b* with the exhaust duct 31. In addition, the valve 60 is controlled so as to prohibit passage between the pipe 56 and the duct 30*b*.

To activate this anti-icing function, the WAIV valve 28 is controlled so as to let circulate hot air from the engines, through the dedicated duct 30*a*. Air then passes through the junction pipe 48 before reaching the anti-icing air intake pipe 38, from which this hot air is distributed in both dual function channels 42 via the ports 52, and in the anti-icing channels 44 via the ports 54. At the outlet of these channels 44, the anti-icing air is collected by the pipe 64 via the ports 68, and then the air travels the junction channel 58 before reaching the duct 30*b*. It is extracted from this duct 30*a* via the three-way valve 26, and then circulates through the exhaust duct 31 towards a zone located outside the wing. Incidentally, in FIG. 10*a*, a possible implantation of the system on an aircraft 1 is represented, in which figure two ducts 30*a*, 30*b* running in parallel to the span direction 36 are shown. In this FIG. 10*a*, it is also shown that the valve 28 is preferentially located on the wing 2, whereas the three-way valve 26 is preferentially located in the fuselage part. Moreover, the exhaust duct 31 can be connected downstream of the pump 27 on the suction duct 29, so as to form downstream one and a single duct having an outlet 37 opening into the fuselage, behind the wing 2. It is consequently through this outlet 37 that the icing air is extracted, as has been depicted by the arrow in this FIG. 10*a*.

It is noted on the other hand that during anti-icing, air does not preferentially rise through the junction pipe 72 towards the suction channels 46, because the passage cross-section of the pipe 30*b* is higher than the passage cross-section of the micro-punches of the channels 46. Air will thus pass preferentially through the pipe 30*b* to reach the outlet 37.

Heating the outer skin 22 is thus made by convection at the anti-icing channels 44, and by mere conduction at the adjacent suction channels 46.

From the pipe 38, hot air also circulates through each dual function channel 42, after it has traveled the corresponding port 52. During its circulation through each channel 42, the anti-icing air is discharged through the multi-punching of the outer skin 22. A so-called "perspiration of the skin 22" phenomenon then occurs. For the nose channel 42, air can also possibly be discharged through slots provided between the lower pressed zones 22*c*, 24*c*, as has been depicted by the arrow 88 in FIG. 9. This hot air discharge through the slots hence enables the lower part of the leading edge to be anti-iced.

During this anti-icing phase, as previously discussed, air occupying the pipe 56 cannot penetrate within the duct 30*b* via the junction pipe 58, because the valve 60 is closed. Furthermore, the boundary layer suction channels 46 are not supplied with hot air via the pipe 38, hence they remain inoperative during this anti-icing phase.

Figure 11:
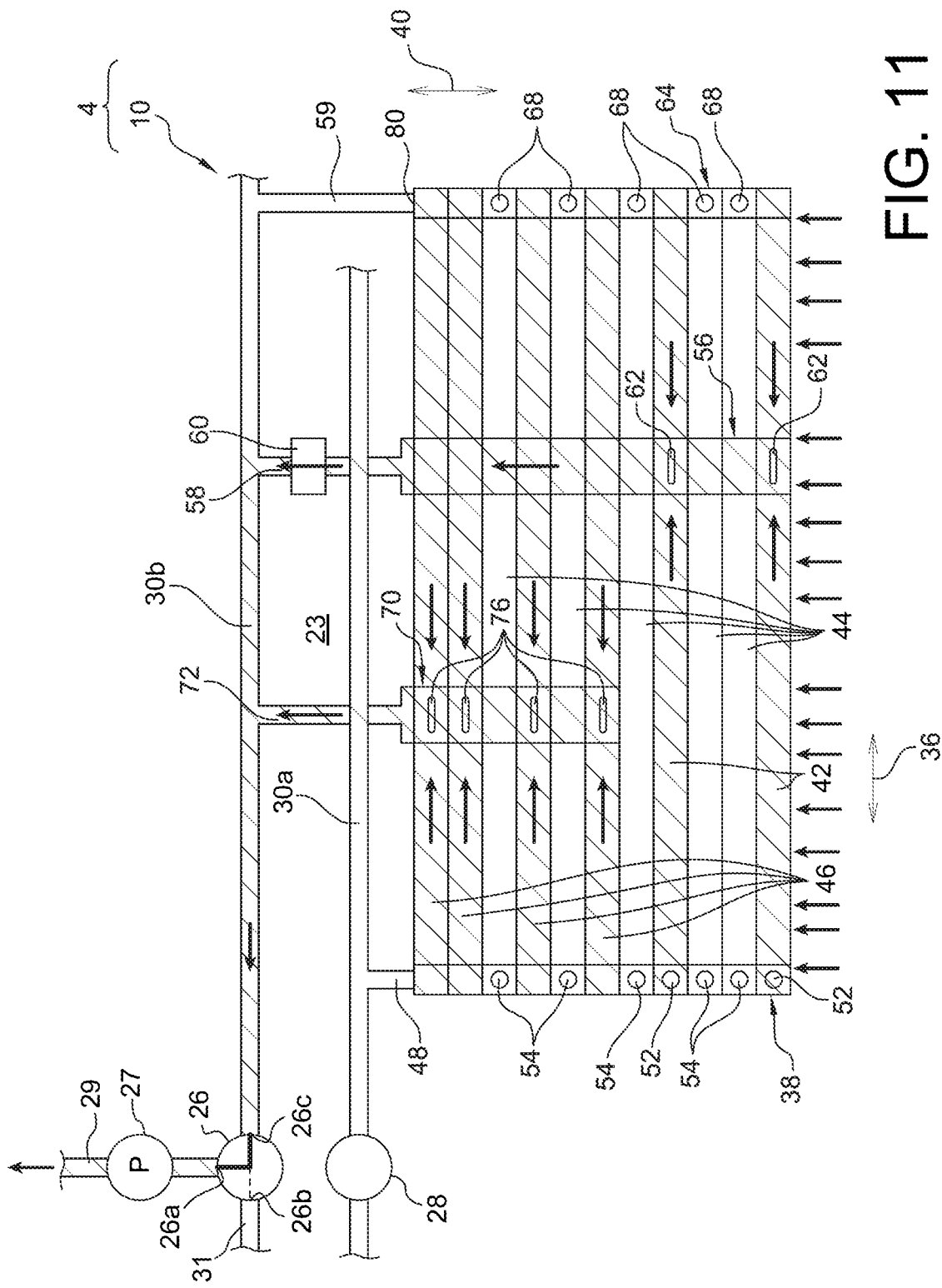
FIGS. 11 to 13 respectively represent similar views to those of FIGS. 8 to 10, depicting the operation of the system during a boundary layer suction phase.
Figure 12:
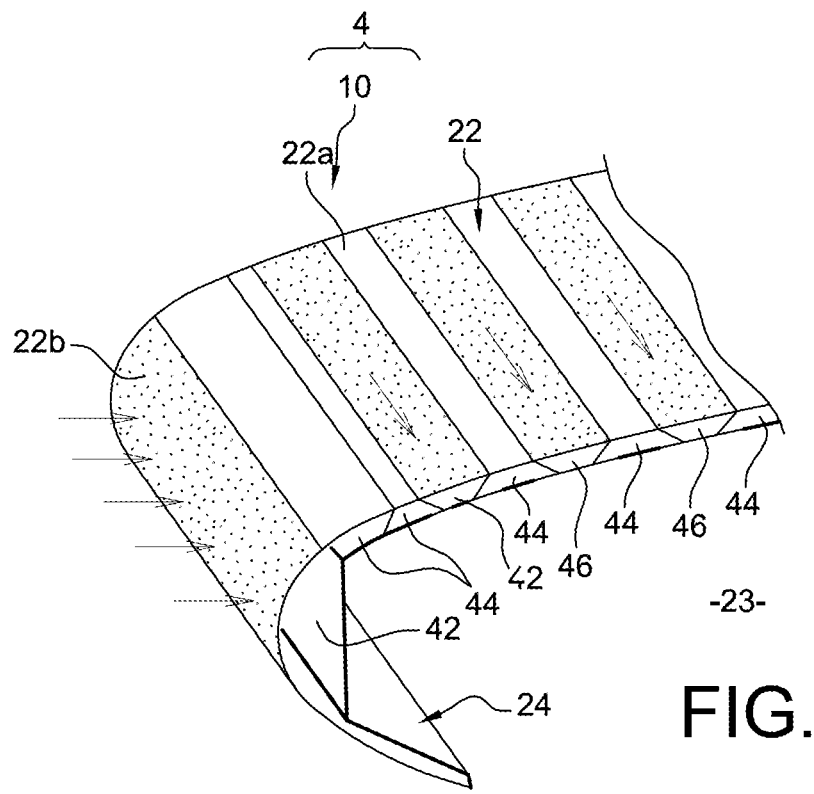
Figure 13:
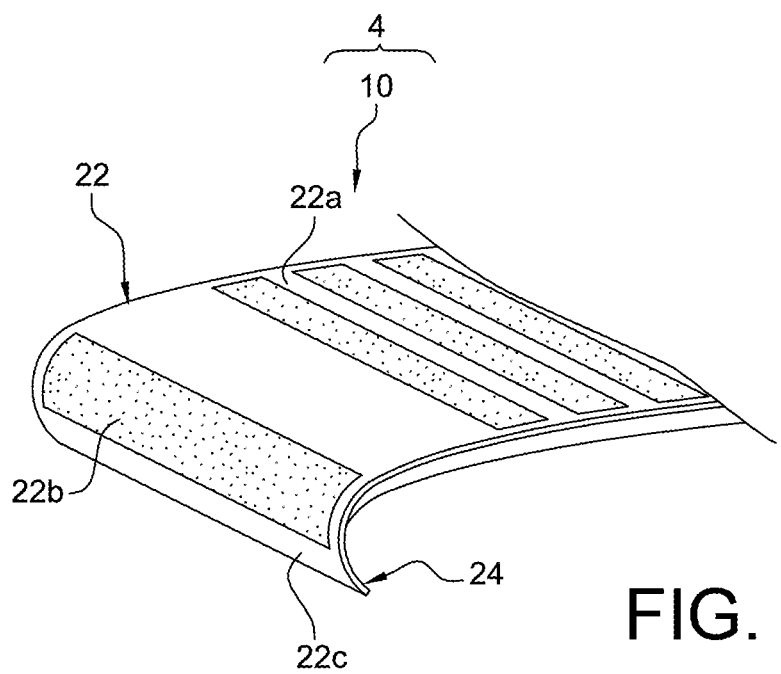

In reference to FIGS. 11 to 13, the operation of the system 20 during a boundary layer suction phase on the front part 10 of the wing 4 is represented. In these Figs., the arrows symbolise the circulation direction of the air sucked through the different elements of the system. In addition, shaded and hatched zones correspond to the zones traveled by the suction air.

During the suction phase, the valve 28 is closed. On the other hand, the valve 26 establishes the fluid communication between both ways 26*a*, 26*c*, so as to communicate the duct 30*b* with the suction duct 29 receiving the pump 27. Moreover, the valve 60 is controlled so as to allow passage between the pipe 56 and the duct 30*b*.

Upstream of this, the suction is first made at the multi-punching of each dual function channel 42, by the nose zone 22*b* and the upper zone 22*a*. This air then joins the pipe 56 via the ports 62, and then penetrates the duct 30*b* after passing through the open valve 60.

The suction is also made by the multi-punchings of the suction channels 46, at the upper zone 22*a* of the outer skin 22. The air circulating in the channels 46 then joins the pipe 70 via the ports 76, and then penetrates the duct 30*b* after passing through the junction pipe 72.

During this boundary layer suction phase, since the anti-icing channels 44 are not multi-punched, they remain inoperative.

In the first preferred embodiment which has been described above, the design is of the "longitudinal concept" type, with a so-called "simple" anti-icing air circulation ("simple flow"). This simple circulation implies that the anti-icing air circulates from one end to the other of the part of the wing concerned by the system, in a single way along the span direction. However, the invention is also applicable to a longitudinal design in which the anti-icing air circulation is said to be "centred" ("centre flow"), with anti-icing air intake pipes centred on the part of the wing concerned by the system, and anti-icing air collecting pipes arranged at the ends of this same part. In this case, anti-icing air longitudinally circulates from the centre to the ends of the wing. The invention is further applicable to a longitudinal design in which the anti-icing air circulation is made reversely with respect to the preceding solution (called "baseline flow"). In this case, the anti-icing air collecting pipes are centred on the part of the wing concerned by the system, and the anti-icing air intake pipes are arranged at the ends of the same part. The anti-icing air thereby circulates longitudinally from the ends of the wing, to the centre.

On the other hand, the invention is also applicable to "chord concept" type designs, in which most of the channels follow not the span direction 36 of the wing, but follow the chord direction 40. In this regard, a second preferred embodiment of the invention will now be described, in which the system assumes a chord design. This second embodiment has numerous similarities with the first embodiment. Consequently, in the figures, the elements bearing the same reference numerals correspond to identical or similar elements.

Figure 14:
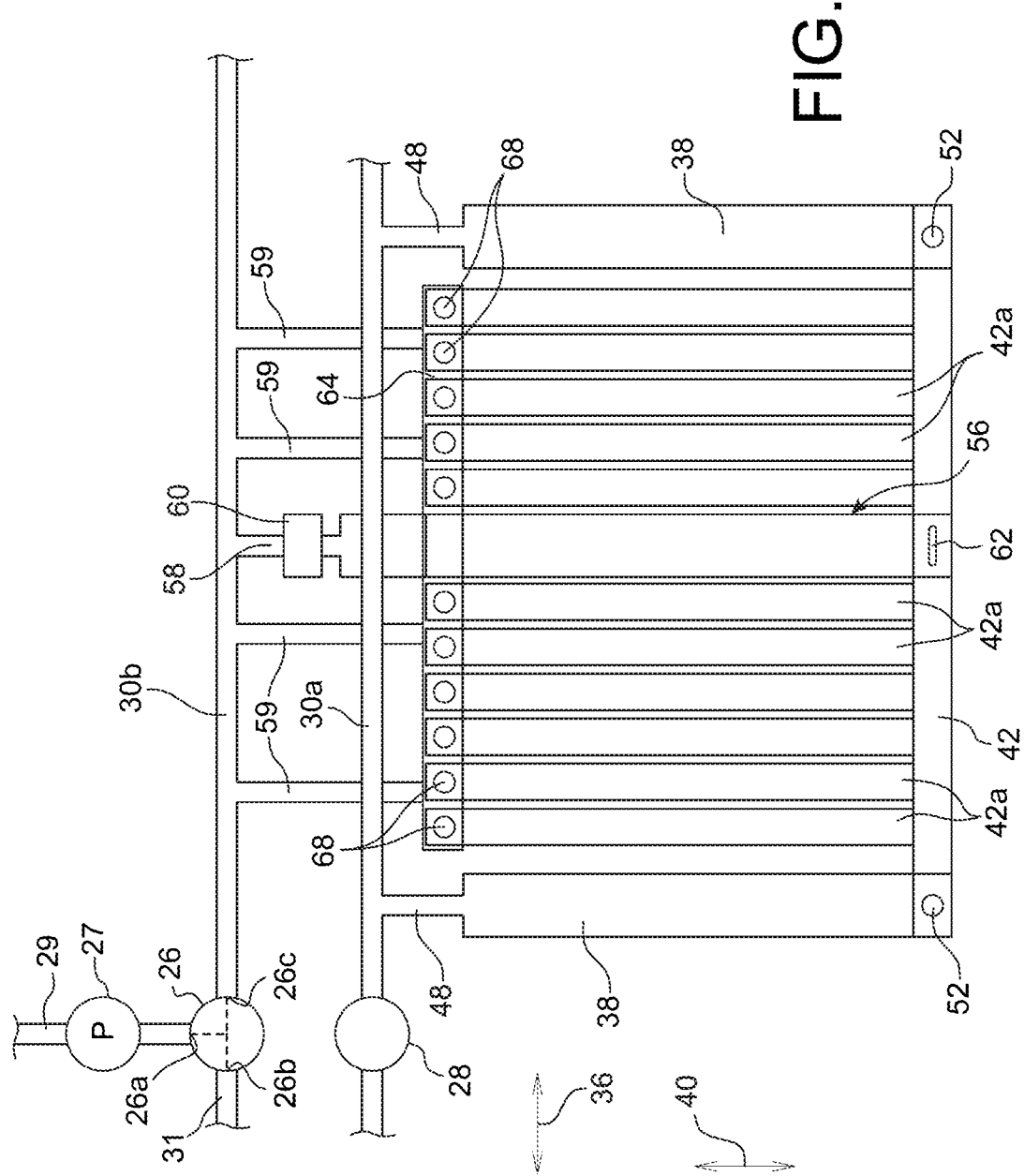
FIG. 14 represents a similar view to that of FIG. 3, with the system in the form of a second preferred embodiment of the invention.
Figure 15:
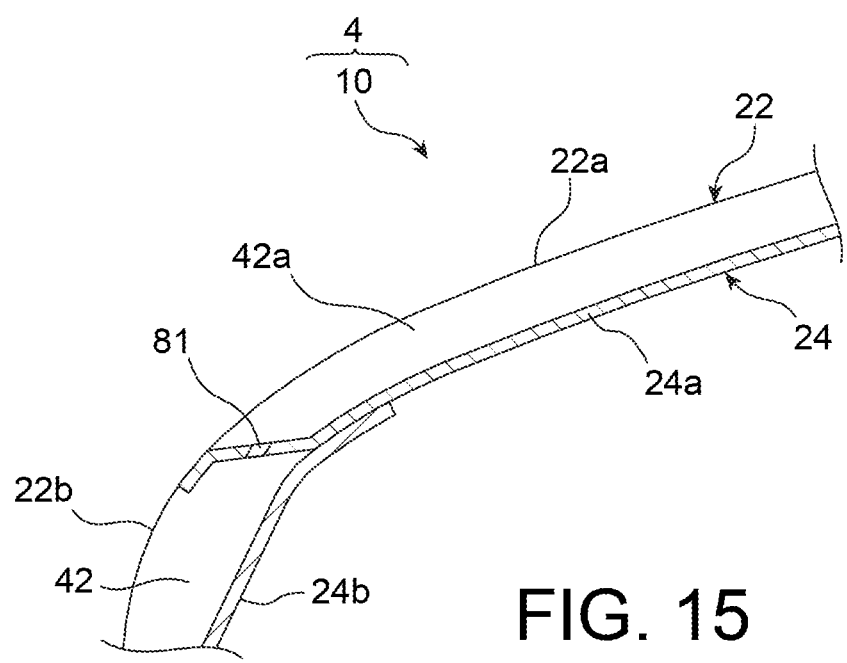
FIG. 15 represents a schematic transverse cross-section view of a front part of one of the wings of the airplane integrating the system shown in FIG. 14.

First in reference to FIGS. 14 and 15, it is noted that the system 20 includes, in an identical manner to that set out within the scope of the first embodiment, both ducts 30a, 30b, the three-way valve 26, the valve 28, the exhaust duct 31 and the suction duct 29. It also comprises a primary dual function channel 42, located at the nose of the wing like the forwardmost channel 42 of the preceding embodiment.

Two anti-icing air intake pipes 38 are also provided, even if a single pipe would be sufficient. These pipes 38 are connected to the duct 30a downstream of the valve 28, at opposite ends of the system along the span direction 36. More precisely, this connection is made through a junction pipe 48 with a small length, located on or in the proximity of a rear end of each pipe 38. Each junction pipe 48 establishes a permanent fluid communication between the duct 30a downstream of the valve 26, and its associated pipe 38.

At its front end, each anti-icing air intake pipe 38 communicates with one end of the primary dual function channel 42, through an anti-icing air inlet port 52 made through the inner skin 24. This port 52 enables a direct communication to be established between the duct 30a and the pipe 38.

The pipes 38 are made in an identical or similar way to that set out within the scope of the first embodiment.

One of the features lies in the fact that the other channels are also with dual function, by being multi-punched, possibly in an unevenly manner. They are called secondary dual function channels 42a. These channels 42a each extend along a chord direction 40 by being arranged in parallel planes spaced from each other along the span direction 36. These channels 42a are not straight, but they each follow the aerodynamic profile of the wing by being defined between the outer and inner skins 22, 24 of the wing.

Each secondary channel 42a has a front end communicating with the primary channel 42, through one or more through ports 81 provided in a skin for delimiting this primary channel 42, as has been represented in FIG. 15. Its rear end communicates with an anti-icing air collecting pipe 64, which is here parallel to the ducts 30a, 30b. The communication between the pipe 64 and the channels 42a is made through anti-icing air collecting ports 68, also provided through the inner skin 24.

A permanent fluid communication is ensured between the pipe 64 and the duct 30b, through several junction pipes 59 arranged orthogonal to the duct 30b and to the pipe 64.

The system 20 further includes a suction air collecting pipe 56, arranged centred between both pipes 38 and parallel to the same. This pipe 56 is connected to the anti-icing air exhaust duct 30b, using a junction pipe 58 with a small length, located on or in the proximity of a rear end of the pipe 56. The junction pipe 56 is equipped with a controlled valve 60 allowing or prohibiting passage of suction air between the pipe 56 and the duct 30b, depending on its position. At its front end, the suction air collecting pipe 56 communicates with the primary dual function channel 42, through a suction port 62 provided through the inner skin 24. However, it is noted that depending on needs and requirements found, the pipe 56 and the valve 60 could be omitted. In this case, all the air sucked thereby passes through the secondary dual function channels 42a.

Figure 16:
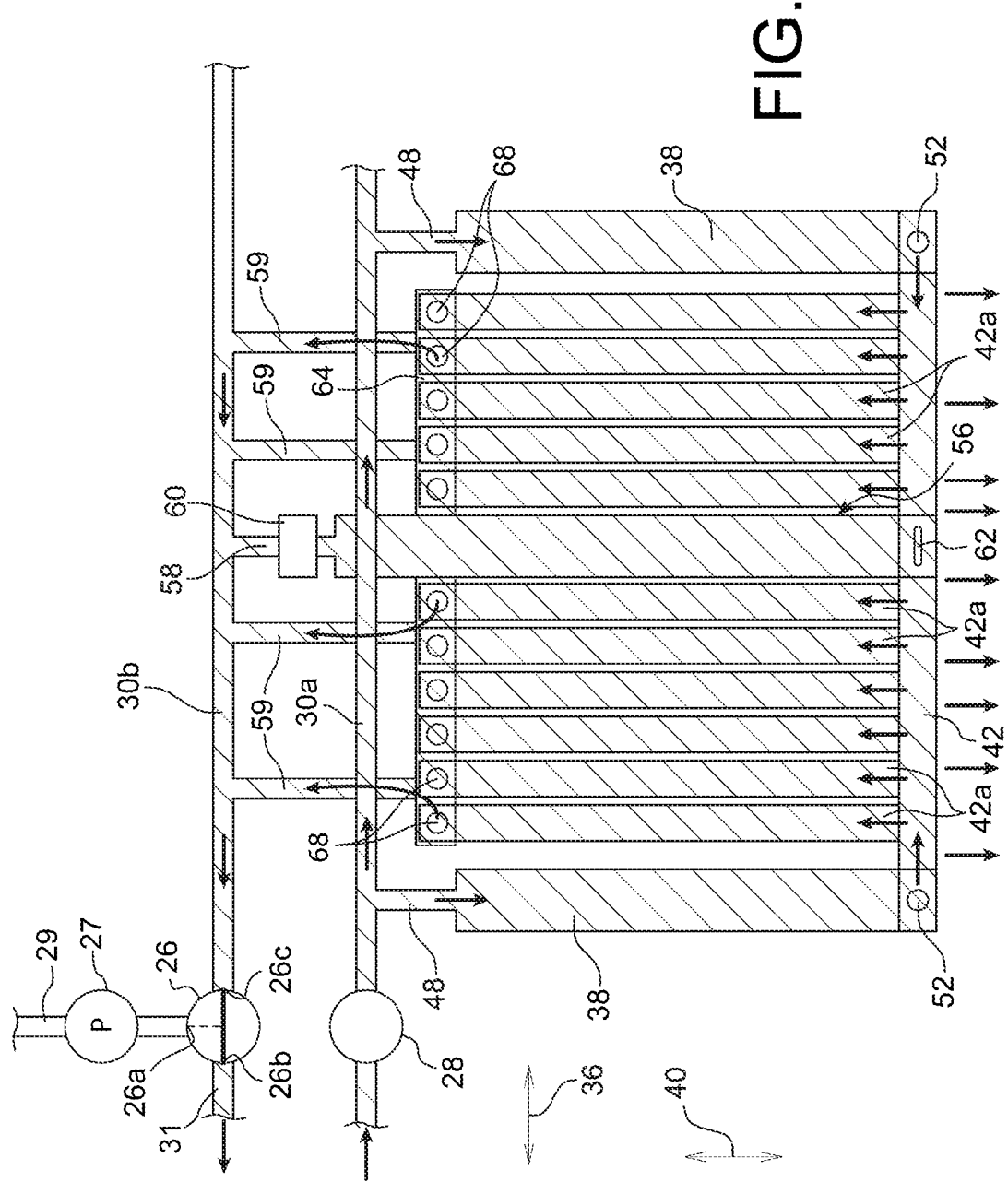
FIG. 16 is a similar view to that of FIG. 14, depicting the operation of the system during a wing anti-icing phase.

FIGS. 16 and 17 respectively show the operation of the system 20 in an anti-icing phase and a suction phase. They respectively correspond to FIGS. 8 and 11 of the first embodiment.

During the anti-icing phase, the valve 26 establishes the fluid communication between both ways 26b, 26c, so as to communicate the duct 30b with the exhaust duct 31. Moreover, the valve 60, when such a valve is provided, is controlled so as to prohibit passage between the pipe 56 and the duct 30b.

To activate this anti-icing function, the WAIV valve 28 is controlled so as to let circulate hot air from the engines, through the dedicated duct 30a. The air then passes through the junction pipes 48 before reaching the anti-icing air intake pipes 38, from which this hot air is distributed in the primary dual function channel 42 via the ports 52. The air then passes through the secondary channels 42a, before being collected by the pipe 64 via the ports 68, and then the air travels the junction channels 59 before reaching the duct 30b. It is extracted from this duct 30a via the three-way valve 26, and then circulates through the exhaust duct 31 towards a zone located outside the wing.

During its circulation through each dual function channel 42, 42a, the anti-icing air is discharged through the multi-punching of the outer skin 22. Then a perspiration phenomenon of the skin 22 occurs. For the primary channel 42, air can also possibly be discharged by slots provided between the pressed upper zones 22c, 24c, as has been depicted by the arrow 88 in FIG. 9.

During this anti-icing phase, as previously discussed, the air occupying the pipe 56 cannot penetrate within the duct 30b via the junction pipe 58, because the valve 60 is closed.

In reference to FIG. 17 representing the operation of the system 20 during a boundary layer suction phase on the front part 10 of the wing 4, it is noted that the valve 26 establishes the fluid communication between both ways 26a, 26c, so as to communicate the duct 30b with the suction duct 29 receiving the pump 27. Moreover, the valve 60, when this as well as the pipe 56 are provided, is controlled so as to allow passage between the pipe 56 and the duct 30b.

The suction is made at the multi-punching of each dual function channel 42, 42*a*. This air then joins the pipe 64, which thus also fulfils a function during this suction phase. Then, it travels the connection ducts 59 before reaching the duct 30*b*. Also, the air sucked by the primary channel 42 joins the pipe 56 via the ports 62, and then penetrates the duct 30*b* after passing through the open valve 60.

Sucked air is then discharged through the suction duct 29, downstream of the three-way valve 26.

Of course, various modifications could be provided by those skilled in the art to the invention just described, only by way of non-limiting examples. For example, it is noted that a same aerofoil such as a wing can be equipped with several systems such as that described in more detail above. These systems are preferentially disposed adjacently along the span direction. Thereby, they can share one or more elements, for example have the ducts 30*a*, 30*b*, and/or the duct 38 in common.

The invention claimed is:

1. An anti-icing and boundary layer suction system, configured to equip an aerofoil of an aircraft, the system comprising:
   at least one anti-icing channel;
   at least one suction channel partly delimited by a multi-punched wall enabling a boundary layer to be sucked on the aerofoil;
   a boundary layer suction control device;
   an anti-icing control device;
   a duct for collecting the suction air communicating with the suction channel;
   an anti-icing air supplying duct connected to the anti-icing control device and communicating with the anti-icing channel through an anti-icing air intake pipe;
   wherein the boundary layer suction control device includes a three-way valve on which the suction air collecting duct, a suction duct, and an anti-icing air exhaust duct are respectively connected;
   the system further comprising an anti-icing air collecting pipe connected to the anti-icing channel and to the suction air collecting duct.

2. The system according to claim 1, wherein the suction air collecting duct and the anti-icing air supplying duct are arranged substantially in parallel to each other, or along a span direction of the aerofoil.

3. The system according to claim 1, further comprising at least one dual function channel in which air for the anti-icing function and air for the boundary layer suction can alternately circulate, the dual function channel being partly delimited by the multi-punched wall enabling the boundary layer to be sucked on the aerofoil, and wherein the dual function channel:
   communicates with the anti-icing air intake pipe; and
   communicates with a suction air collecting pipe connected to the suction air collecting duct, via a controlled valve.

4. The system according to claim 1, further comprising at least one suction air collecting secondary pipe allowing communication between each boundary layer suction channel and the suction air collecting duct.

5. The system according to claim 1, further comprising plural anti-icing channels and plural boundary layer suction channels substantially parallel to each other, and wherein at least some of the anti-icing channels and of the boundary layer suction channels are alternately arranged.

6. An aerofoil for an aircraft comprising at least one anti-icing and boundary layer suction system according to claim 1.

7. An aircraft comprising least one anti-icing and boundary layer suction system according to claim 1.

8. The system according to claim 3, configured such that the anti-icing air circulating through the dual function channel does not penetrate the anti-icing air collecting pipe.

9. The system according to claim 3, further comprising a plurality of dual function channels in which air for the anti-icing function and air for the boundary layer suction can alternately circulate, including:
   a dual function primary channel, directly communicating with the anti-icing air intake pipe; and
   dual function secondary channels, communicating with the dual function primary channel and with the anti-icing air collecting pipe, the dual function secondary channels being arranged substantially in parallel to each other and substantially orthogonal to the dual function primary channel and to the anti-icing air collecting pipe.

10. The system according to claim 4, further comprising a suction air collectin pipe connected to the suction air collecting duct and wherein the anti-icing air intake pipe, the suction air collecting pipe, each suction air collecting secondary pipe, and the anti-icing air collecting pipe each follow the aerodynamic profile of the aerofoil, by being arranged in parallel planes, spaced from each other along a span direction of this aerofoil.

11. The system according to claim 5, successively comprising, in a chord direction from a leading edge of the aerofoil:
   a dual function channel;
   a plurality of the anti-icing channels; and then
   an alternation between the air suction channels and the other anti-icing channels,
   the anti-icing channels, the suction channels, and the dual function channel extending in parallel to each other, along a span direction of the aerofoil.

12. The system according to claim 9, wherein the dual function secondary channels are arranged in parallel planes, spaced from each other along a span direction of the aerofoil.

13. The system according to claim 9, wherein the suction air collecting duct, the anti-icing air supplying duct, the dual function primary channel, and the anti-icing air collecting pipe are arranged substantially parallel to each other along a span direction of the aerofoil.

14. The system according to claim 9, wherein the suction air collecting duct and the anti-icing air collecting pipe communicate together through at least one junction pipe.

15. The aerofoil according to claim 6, which is a wing or a tail unit.

16. An aircraft comprising at least one aerofoil according to claim 6.

* * * * *